United States Patent
Kapels et al.

[11] Patent Number: 6,094,985
[45] Date of Patent: Aug. 1, 2000

[54] ROTATION RATE SENSOR

[75] Inventors: Hergen Kapels, Neubiberg; Christofer Hierold; Max Steger, both of München; Thomas Scheiter, Oberhaching; Reinhold Noe, Paderborn; Ulrich Näher, München, all of Germany

[73] Assignee: Siemens Aktiengesellschaft, Munich, Germany

[21] Appl. No.: 09/308,730

[22] PCT Filed: Nov. 14, 1997

[86] PCT No.: PCT/DE97/02671

§ 371 Date: May 24, 1999

§ 102(e) Date: May 24, 1999

[87] PCT Pub. No.: WO98/23917

PCT Pub. Date: Jun. 4, 1998

[30] Foreign Application Priority Data

Nov. 22, 1996 [DE] Germany .............. 196 48 425

[51] Int. Cl.[7] ....................................... G01P 9/04
[52] U.S. Cl. ............................................. 73/504.13
[58] Field of Search ................. 73/504.11, 504.08, 73/504.13, 504.12, 504.02

[56] References Cited

U.S. PATENT DOCUMENTS

| | | |
|---|---|---|
| 5,226,321 | 7/1993 | Varnham et al. ............ 73/514.02 |
| 5,313,835 | 5/1994 | Dunn . |
| 5,377,544 | 1/1995 | Dunn . |
| 5,511,419 | 4/1996 | Dunn ............................ 73/504.08 |

FOREIGN PATENT DOCUMENTS

| | | |
|---|---|---|
| 0 461 761 | 12/1991 | European Pat. Off. . |
| 195 23 895 | 1/1997 | Germany . |
| WO 96/35957 | 11/1996 | WIPO . |

*Primary Examiner*—Richard A. Moller
*Attorney, Agent, or Firm*—Hill & Simpson

[57] ABSTRACT

Rotation rate sensor as a micromechanical component in silicon, in which a ring with a rigid strut along a diameter is so suspended at elastic braces and anchoring arrangements on a substrate as to be able to perform rotation oscillations about its center axis and to be able to be tilted about the strut under the influence of outer torques. There are electrodes present at the ring and at the substrate, at which electrodes electrical voltages can be applied such that rotary oscillations of the ring about its center axis can be excited and rotary oscillations about the strut can be detected. To stabilize the position of the ring in the neutral position, additional electrodes can be provided at the ring and at the substrate for the generation of electrostatic forces.

7 Claims, 1 Drawing Sheet

ROTATION RATE SENSOR

The present invention relates to a rotation rate sensor as a micromechanical component in silicon.

Rotation rate sensors (gyroscopes) serve for the measurement of angular velocity. Mechanical gyroscopes correspond in their function to a gyro compass and measure occurrent rotations by a precessional motion of a rotating body. Given a rotation of such an arrangement about an axis which is situated perpendicular to the axis of rotation of the rotating body, a rotary motion emerges about a line which is situated perpendicular to these other two axes of rotation. The strength of the torque effecting this rotation is a measure of the rotary motion of the overall system. In systems wherein complete rotations are not possible or are not desirable, the free rotation of the gyroscope can be replaced by an oscillating rotation. U.S. Pat. No. 5,313,835 and U.S. Pat. No. 5,377,544 describe micromechanical gyroscopes in which a ring is fastened to springing braces on a substrate such that the ring can be made to rotate in an oscillating fashion by electrostatic forces, given the application of suitable voltages at electrodes that are provided for this purpose. Additional electrodes over and under the ring are provided for the detection of an excursion of the ring out of the plane of rotation. A described alternative measuring method is to totally compensate potential excursions of the rotor from its plane of rotation by means of a closed electrical circuit and to determine the size of the torque from the voltage necessary to do this.

SUMMARY OF THE INVENTION

It is an object of the present Invention to propose a micromechanical rotation rate sensor which can be produced with good operating characteristics in surface micromechanics in the framework of a VLSI-compatible production process. This object is achieved by the inventive micromechanical rotation rate sensor which has an annular structure with a relatively thick strut arranged along a diameter of this ring. In a plan view, this ring with the strut looks like a spoked wheel from which all the spokes have been removed except for two that lie on the same line. This linear double-spoke which supplements the ring, which is designated a strut overall here and in the claims, also serves for the securing of the ring on the substrate, which is preferably silicon. It must be possible to make the ring rotate in an oscillating manner about its center axis, i.e. the axis extending through the center point of the ring and lying perpendicular to the ring plane. An excursion of the ring from the neutral position must also be possible by a tilting from the ring plane. In the inventive rotation rate sensor, this tilting is provided about an axis which extends parallel to the position of the strut in the neutral position of the ring. This rotation rate sensor thus detects a rotation which occurs about an axis that lies perpendicular to the center axis of the ring and to the axis of the strut in the neutral position of the ring.

The springing suspension of the ring which is necessary for this is achieved by springing braces which are attached to the strut, on the one hand, and to anchoring arrangements that are secured on the substrate, on the other hand. These springing braces are preferably attached to the strut optimally close to the center point of the ring, and the anchoring arrangements on the substrate should also be arranged optimally close to the center point of the ring. The utilization of a rotor which is formed by a ring with an optimally rigid strut that extends along a diameter has the advantage that only negligibly small non-linear components, if any, arise in the restoring springing force. It is particularly important here that the strut is optimally rigid, particularly in relation to the elasticity of the springing braces at which it is suspended. This is best achieved by the provided width of the strut The relative change in the torsional rigidity, given small angles of excursion, is particularly small in the given embodiment The greater this relative change in the torsional rigidity is, the behavior of the suspension is less linear and it is more difficult to conduct a reliable measurement therewith. On the other hand, the strut is not selected too wide, in order not to compromise the possible arrangements of the braces which are provided as a suspension.

The shape and arrangement of the springing braces are also essential to the proper functioning of the inventive rotation rate sensor. Polysilicon is preferably used as material for the moving part If the ring can only be produced such that tensile stresses arise in the ring, the anchoring arrangements of the braces should then be far removed from the center point of the ring, i.e., should be situated in the vicinity of the ring. Given arising compressive strains, the anchoring arrangements should be situated optimally close to the center point of the ring. In practical embodiments, the latter variation is more suitable; i.e., the anchoring arrangements should be attached optimally far to the interior. On the other hand, a sufficient rotation of the ring must be guaranteed. The anchoring arrangements must thus be attached sufficiently far from the strut, so that a sufficient torsional oscillation of the ring about its center axis can occur. The anchoring arrangements are arranged at a point removed from the center point of the ring by a distance which is less than one-tenth of the inner diameter of the ring and the braces are attached at the strut as a point removed from the center point of the ring by a distance less than one-quarter of the inner diameter of the ring. A special significance is afforded the angle between the strut and the nose of the braces at the strut. The detection oscillation occurs about the axis of the strut. Depending on whether one selects a large or small angle between the strut and the nose of the springing braces, the springing braces are either bent or tax twisted about the axis of the strut in the excursion of the ring from the plane of its neutral position. Since a torsional oscillation is softer than a bending oscillation (smaller springing constant with a linear dependence of the restoring torque on the angle of excursion), the natural frequency of the rotary oscillation about the axis of the strut can be suitably set by means of an appropriate selection of the designated angle, and, in particular, the natural frequency of the rotary oscillation about the center axis and the natural frequency of the detection oscillation about the axis of the strut can be matched to one another.

DESCRIPTION OF THE PREFERRED EMBODIMENT

Figure 1:
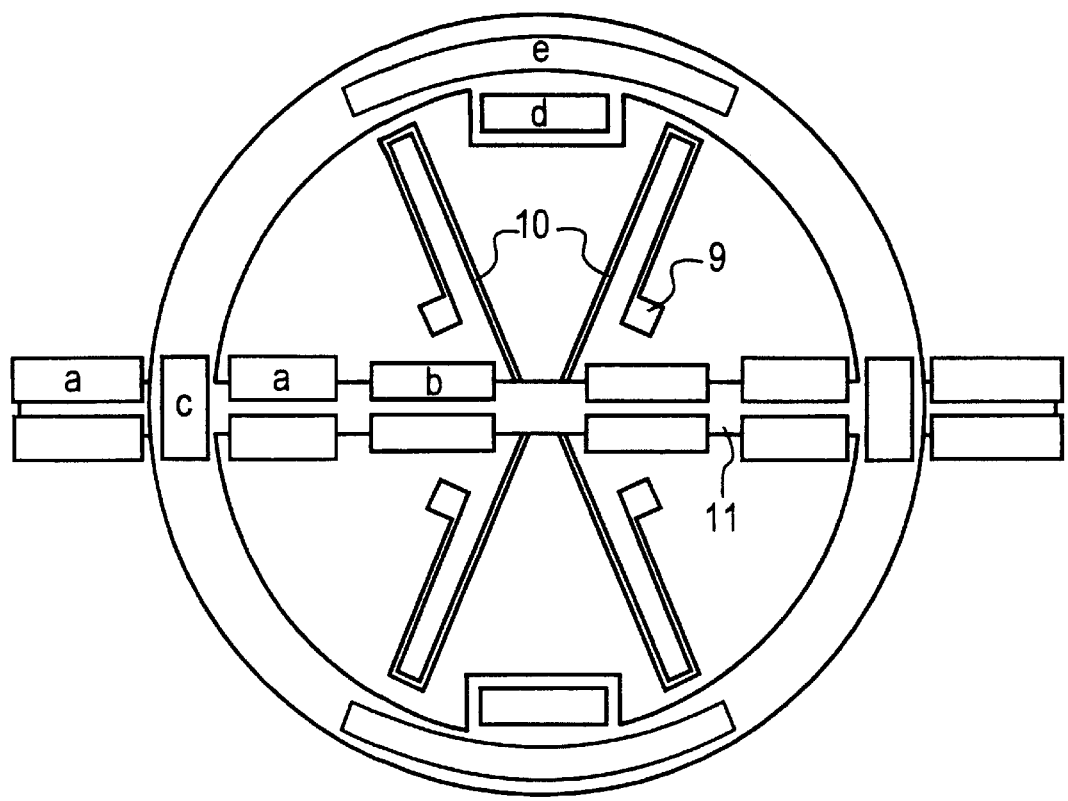
FIG. 1 depicts a schematic plan view of the inventive arrangement.

The ring is made to oscillate in a rotary fashion about its center axis (perpendicular to the plane of projection of FIG. 1) by at least two lateral drive electrodes. Noses are preferably provided at the outside of the ring for this purpose. These noses can be ridge-type or handle-type formations. Electrodes are arranged at these noses. Counter-electrodes are arranged opposite these electrodes in the plane of the ring, or above or below this plane, which counter-electrodes are fixedly attached to the substrate. If the counter-electrodes are present in the plane of the ring, then it is advantageous to develop the electrodes at the ring and at the substrate, respectively, with a comb-like structure. Given an arrangement of the counter-electrodes that are fixed at the substrate above or below the ring plane, it is advantageous if the counter-electrodes are attached in pairs, at the same distance above and below the ring. In FIG. 1, corresponding counter-electrodes are illustrated above the ring as drive electrodes over the lateral noses of the ring 1, which noses are located in extensions of the illustrated strut 11. In this example, a total of four electrodes are attached at the substrate as drive electrodes in each drive structure. One of these electrodes is attached above and below the ring plane and is offset laterally in each direction of rotation, respectively. If it is not possible with this arrangement to maintain exactly the same distance from the respective electrode that is secured at the ring 1 to the electrodes that are fixedly secured at the substrate above and below the ring plane, then it can be assured by additional control electrodes c, d that the rotor is stabilized in the center position by means of applied voltages on the basis of the arising electrostatic forces. To this end, the exact position of the rotor is detected via a capacitive difference measurement, which is known per se, at the electrode pairs formed by the respective electrode that is secured at the ring and a respective electrode that is secured at the substrate and is arranged above, or respectively, below the plane of the ring. By the application of additional voltages to these pairs of electrodes, the ring can be respectively drawn exactly into its center position. This additional stabilization, with which a tilting of the ring out of the plane of rotation can also be prevented, can also be provided in the embodiment with comb-structured drive electrodes.

The ring is suspended at anchoring arrangements 9, which are attached to the substrate at springing braces 10, which are attached at the strut 11; these braces 10 are preferably connected to the strut 11 optimally close to the center point of the ring 1: Given the presence of compressive strain in the rotor, the anchoring arrangements 9 should likewise be arranged optimally close to the ring's center point. The braces 10 are structured with such a thickness and length as to achieve the required springing effect. The braces 10 preferably consist of two portions which extend at least approximately along a radius of the ring. Conditioned by the arrangement of the anchoring arrangements 9 and by the angle that is formed between the brace 10 and the strut 11, the braces which are illustrated in FIG. 1 do not extend precisely along a radius, but only approximately so, given the structuring illustrated there.

By means of the drive electrodes a, additional electrode pairs of which can also be arranged in the region of the strut 11, as illustrated, the ring 1 is made to oscillate in a rotary fashion about its center axis, which extends perpendicular to the plane of projection. Given the arising of a torque about the axis extending perpendicular to the axis of the strut 11 in the plane of projection, a tilting ensues of the ring 1, which is performing the rotary oscillation, about the axis of the strut 11. Such a tilting is detected by means of the detection electrodes e which are attached at the ring and at the substrate, above and below the plane of the ring. Due to the springing suspension of the ring, this tilting likewise leads to an oscillating rotation. To detect this oscillation, the extent of the excursion from its neutral position made by the ring in this oscillation is ascertained via a difference measurement of the capacitances of the electrode pairs constituted by an electrode at the ring and an upper, or respectively, lower electrode at the substrate, respectively. To achieve a high detection sensitivity, the electrode surface must be optimally large. Besides this measuring method (open loop), a measuring method by means of a closed electrical circuit (closed loop) is also possible. In this closed-loop operation, the ring is held in the plane of its neutral position by the application of compensation voltages of a suitable size, and the voltage(s) required for this is measured in order to obtain the measurement result.

In the embodiment depicted in FIG. 1, electrodes for controlling the amplitude and phase of the oscillation are additionally provided above the strut 11 as control electrodes b. In alternative developments of the inventive sensor, a part of the electrode pairs can be omitted, these being illustrated in FIG. 1 only for the sake of completeness. A tilting of the ring from its plane can be prevented by the application of suitable compensation voltages at the drive electrodes, for example. Arrangements are thus possible wherein the electrode pairs are simplified relative to the embodiment depicted in FIG. 1 or are modified according to the respective requirements.

In order to achieve an optimally great amplitude of the rotary oscillation about the center axis, it is advantageous to excite the rotary oscillation about the center axis of the ring with the resonant frequency of the arrangement. This excitation frequency, which is generated by wiring, must then correspond to the natural frequency of the rotor for the rotation about the center axis. In addition, the rotary oscillation about the axis parallel to the strut 11, which oscillation is effected by a Coriolis force that is brought about by a rotation which is to be measured, can also be driven in tune. Since this involves a forced oscillation with the same frequency with which the rotary oscillation about the center axis is excited, it is necessary for this specific embodiment to bring the natural frequencies of the drive oscillation and of the detection oscillation of the rotor into agreement. These natural frequencies can be matched to one another relatively easily in that an additional voltage is applied at electrode pairs. An oscillation which is excited by electrostatic forces that arise given the application of a voltage at electrodes can be purposefully varied in its natural frequency in that an additional voltage is applied at these electrodes that are provided for the excitation of the oscillation. This method is used in the electronic control of the sensor in order to match said natural frequencies to one another. It is sufficient if the natural frequencies of the drive oscillation and of the detection oscillation at least approximately agree. In order to improve the quality of the resonance effects, the rotation rate sensor can additionally be driven in a vacuum. The rotation rate sensor can be encapsulated in a housing to this end.

When the excitation of the sensor must be actively stabilized, i.e. when voltages must be applied at the provided electrodes in order to hold the ring plane in a provided position, and if the detection oscillation is also prevented in a closed-loop operation, then the detection oscillation cannot be measured in the resonant operation. This difficulty can be avoided in that the rotary oscillation about the center axis is excited together with a stabilization of the ring plane only during a specified time interval. The rotary oscillation is excited up to the maximum amplitude by means of the drive electrodes. During this excitation phase, the ring can be stabilized in the plane of its neutral position by electrostatic forces which are brought about by suitable voltages at the various electrode pairs. The provided voltages are switched off subsequent to the excitation. There follows a phase in which the oscillating ring decays. During this decaying phase, the detection oscillation about the axis of the strut builds. It becomes advantageously noticeable here that the excitation oscillation about the center axis of the ring has a significantly higher quality (narrower and steeper resonance curves, i.e. more distinctive resonance) than the detection oscillation about the axis of the strut. This means that the duration of the decaying phase (product of period length and quality) is sufficient for the detection oscillation to be able to fully develop. This other exemplifying embodiment utilizes an alternating drive operation and detection operation of the sensor. The duration of these two phases can be about 10 ms, for example.

The inventive structure of the rotation rate sensor enables the production of this sensor in the framework of a VLSI process and its integration on the same chip with components of an electronic circuit that is provided for the operation of the sensor. The production occurs essentially with a standard VLSI process. Relatively few additional steps need to be inserted into the standard process in order to produce the sensor.

Figure 2:
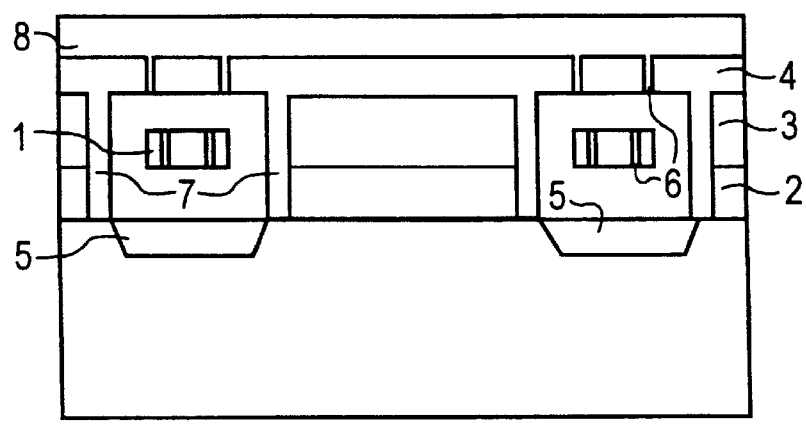
FIG. 2 depicts a sectional lateral view of an inventive sensor.

In an exemplifying embodiment which is depicted cross-sectionally in FIG. 2, doped regions 5 are produced in a substrate of semiconductor material, which regions are provided as lower counter-electrodes, e.g. drive or detection electrodes. Additional doped regions which are provided for electronic components can be produced at the same time. For example, in the framework of a CMOS process, the doped regions which are provided for the source and drain MOSFETs are produced. On the top side, the deposition of an auxiliary layer ensues, onto which layer a layer of the material that is provided for the ring is first deposited whole-surface and is then appropriately structured. From this layer, the ring 1, the strut 11, the springing braces 10 and the anchoring arrangements 9 are produced, preferably so as to be continuous. To be able to place the anchoring arrangements fixedly on the substrate, it is advantageous if, prior to the deposition of this layer that is provided for the ring, holes are first produced in the auxiliary layer, which holes are then subsequently filled with the material for the ring. In this way, a connection of the ring to the surface of the substrate is produced via the braces and anchoring arrangements. Polysilicon is preferable as a layer that is provided for this purpose, it being possible to deposit this together with a polysilicon layer that is provided for the gate electrodes of MOSFETs, for example. Such a layer is preferably deposited in a thickness of approximately 400 nm. A separate deposition of the silicon or polysilicon layer that is provided for the ring subsequent to the deposition of the polysilicon for the electronic components is also possible. In this case, the portion of the electronic components on the substrate is covered with silicon oxide, for example, or with some other protective layer. In the structuring of the rotor that is provided for the sensor, the silicon or polysilicon layer that is deposited for this purpose over the electronic part is entirely removed. The layer that is provided for the rotor is electrically conductively doped.

In a preferred exemplifying embodiment of the production method, an oxide layer is used as auxiliary layer; for example, given the utilization of silicon, a field oxide 700 nm thick that is produced in the framework of the CMOS process. Such an oxide layer can be removed selectively with respect to the silicon or polysilicon of the rotor that is provided for the sensor. Subsequent to the structuring of the rotor, an upper auxiliary layer is deposited, which can also be an oxide. In the framework of the CMOS production method, a BPSG (boron phosphorus silicate glass) layer approximately 1000 nm thick can be used, for example. This upper auxiliary layer can potentially be etched back to a suitable thickness. Contact holes for the electrical connection of the doped regions and of a stationary anchoring arrangement of the rotor are etched and filled with the material that is provided for the terminal contacts.

A metal layer, potentially made of doped polysilicon, is deposited and structured, with which the upper counter-electrodes for drive and detection are produced. The two auxiliary layers above and below the rotor are removed using an etching agent (silicon oxide e.g. with an etching solution containing HF) optimally soon after the deposition and structuring of this layer that is provided for the upper counter-electrodes. It is advantageous here if additional etching holes 6 are produced in the structuring of the ring, so that the etching agent also reaches through to the bottom side of the ring 1 through these etching holes 6. This simplifies the removal of the lower auxiliary layer. Residues of the auxiliary layer can remain where a support of the structured layer on the substrate is provided. Such support points can be provided under the anchoring arrangements 9, for example. For a deposited metal layer which can also be provided as surfacing, a support on the substrate is possible with vertical supports, which can be produced by filling the contact holes with metal (e.g. tungsten). In FIG. 2, the portions of the metal layer 4 which are not structured as counter-electrodes and which function as surfacing or as a protective layer are depicted as being supported on the substrate by such supports 7. In the metal layer 4 there are interspaces between the structured regions or etching holes 6, through which interspaces the auxiliary layers are so removed that the ring 1 is sufficiently mobile as a rotor. To support the interspaces between the moving parts of the rotor, residues of the lower auxiliary layer 2 and of the upper auxiliary layer 3 remain between the substrate and additionally deposited layers. After the rotor has been etched free, the sensor can be passivated and/or sealed gas-tight by the deposition of another layer 8 (e.g. oxide or nitride). The described production method is suitable for the production, in parallel steps, of micromechanical components of the rotation rate sensor and appertaining electronic components. Alternatively, given the extensive integration of the components, a method can also be executed whereby first one part (electronic or mechanical) is produced, and then the respective other part is produced separately. A durable masking of the respective finished part is performed for this (e.g. with nitride), which need not be removed subsequently, as warranted.

We claim:

1. Rotation rate sensor as a micromechanical component, said sensor comprising:

a substrate:

a ring having a strut which is present along a diameter and which looks from a top view like a spoked wheel which has only tnvo spokes situated on the same line, said strut being suspended by springing braces, which are of a smaller width than the strut and which are attached at anchoring arrangements, which are secured on the substrate, said braces being so shaped and said anchoring arrangements big so arranged that the ring can execute rotations at least about a prescribed angle in both directions about both a center axis of the ring and about an axis of the strut, the braces being attached at the strut at a point removed from the center point of the ring of less than one-quarter the inner diameter of the ring, and electrodes on the ring and adjacent thereto on the substrate for an excitation of a rotary oscillation about the center axis and for a detection of a torque arising about the strut.

2. Rotation rate sensor according to claim 1, in which the ring and the springing braces are made of polysilicon.

3. Rotation rate sensor according to claim 1, in which the electrodes are arranged at the substrate above or below the plane in which the ring is arranged.

4. Rotation rate sensor according to claim 1, in which the anchoring arrangements are arranged at a print removed from the center point of the ring of less than one-tenth the inner diameter of the ring.

5. Rotation rate sensor according to claim 4, in which the braces have two portions which extend parallel to one another at least approximately along a radius of the ring.

6. Rotation rate sensor according to claim 1, in which the braces are attached at the strut at such an angle between the strut and the braces so that the natural oscillation of the ring about the strut is adjusted, as precisely as is provided, to the natural oscillation of the ring about its center axis.

7. Rotation rate sensor according to claim 1, in which an electrical circuit is integrated for operation and in which this circuit is provided for the generation of an alternating voltage, which is utilized for the excitation of the rotanr oscillation, and for the generation of other voltages of such a size that, when these other voltages are adjacent at electrodes of the sensor which are provided for this purpose, the natural oscillation of the ring about the strut is adjusted, as precisely as is provided, to the natural oscillation of the ring about its center axis.

* * * * *